(12) United States Patent
Torsner et al.

(10) Patent No.: US 12,131,542 B2
(45) Date of Patent: Oct. 29, 2024

(54) PROCESSING MEDIA DATA WITH SENSITIVE INFORMATION

(71) Applicant: Telefonaktiebolaget LM Ericsson (publ), Stockholm (SE)

(72) Inventors: Johan Torsner, Kyrkslätt (FI); Jonas Kronander, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 17/638,036

(22) PCT Filed: Aug. 30, 2019

(86) PCT No.: PCT/SE2019/050810
§ 371 (c)(1),
(2) Date: Feb. 24, 2022

(87) PCT Pub. No.: WO2021/040589
PCT Pub. Date: Mar. 4, 2021

(65) Prior Publication Data
US 2022/0277567 A1    Sep. 1, 2022

(51) Int. Cl.
*G06V 20/50* (2022.01)
*G06F 21/62* (2013.01)
(Continued)

(52) U.S. Cl.
CPC .......... *G06V 20/50* (2022.01); *G06F 21/6254* (2013.01); *G06V 20/625* (2022.01); *G06V 40/10* (2022.01); *G10L 25/57* (2013.01)

(58) Field of Classification Search
CPC ............ G07F 19/207; G06Q 20/40145; G06Q 20/40; G07C 9/37; G07C 9/257
See application file for complete search history.

(56) References Cited

U.S. PATENT DOCUMENTS 6,430,306 B2 * 8/2002 Slocum .................. G06V 40/16
382/118
7,787,028 B2 * 8/2010 Kojo ....................... G06T 11/00
345/629

(Continued)

OTHER PUBLICATIONS

International Search Report and Written Opinion of the International Searching Authority for PCT International Application No. PCT/SE2019/050810 dated Jun. 5, 2020.

(Continued)

*Primary Examiner* — Yosef Kassa
(74) *Attorney, Agent, or Firm* — Sage Patent Group

(57) ABSTRACT

It is provided a method for processing input media data. The method is performed in a media data processor and comprising the steps of: obtaining input media data; identifying, in the input media data, sensitive information; generating replacement information, wherein the replacement information is at least partly anonymised information corresponding to the sensitive information, and the replacement information contains at least one characteristic based on the sensitive information; modifying the input media data by replacing its sensitive information with the replacement information, resulting in a modified media data; and providing the modified media data for further processing.

20 Claims, 4 Drawing Sheets

(51) Int. Cl.
    *G06V 20/62*      (2022.01)
    *G06V 40/10*      (2022.01)
    *G10L 25/57*      (2013.01)

(56) References Cited

U.S. PATENT DOCUMENTS

| | | | | |
|---|---|---|---|---|
| 8,117,183 | B2* | 2/2012 | Mestha | G06F 16/5838 |
| | | | | 707/711 |
| 8,417,960 | B2* | 4/2013 | Takahashi | H04L 9/0866 |
| | | | | 340/5.82 |
| 8,558,663 | B2* | 10/2013 | Newman | G07F 19/20 |
| | | | | 340/5.4 |
| 8,948,541 | B2* | 2/2015 | Neville | H04N 1/00188 |
| | | | | 382/284 |
| 2017/0289623 | A1 | 10/2017 | Bailey et al. | |
| 2018/0018508 | A1 | 1/2018 | Tusch | |
| 2018/0300578 | A1 | 10/2018 | Wilbert et al. | |

OTHER PUBLICATIONS

Szczuko, "Augmented Reality for Privacy-Sensitive Visual Monitoring," Communications in Computer and Information Science, MCSS 2014, CCIS 429, pp. 229-241.

Letournel et al., "Face De-Identification with Expressions Preservation," International Conference on Image Processing (ICIP) 2015, pp. 4366-4370.

Zambanini et al., "Detecting Falls as Homes Using a Network of Low-Resolution Cameras," 10th IEEE International Conference on Information Technology and Applications in Biomedicine (ITAB), 2010, pp. 1-4.

Ren, Zhongzheng et al.; "Learning to Anonymize Faces for Privacy Preserving Action Detection"; https://arxiv.org/pdf/1803.11556.pdf; Jul. 26, 2018; XP 93041135A, 17 pages.

Ren; Jason; "Learning to Anonymize Faces for Privacy Preserving Action Detection"; https://youtube.com/watch?v=CYu_Ctm23G8; Mar. 30, 2018, XP093041138, 2 pages.

Trugaming; "VoiceMod Review : Voice changing software for Twitch"; https://youtube.com/watch?v=sR3hJxWDbLA; Oct. 29, 2018; XP093041211, 2 pages.

Extended European Search Report mailed May 3, 2023 for EP Application No. 19943726.0, 6 pages.

* cited by examiner

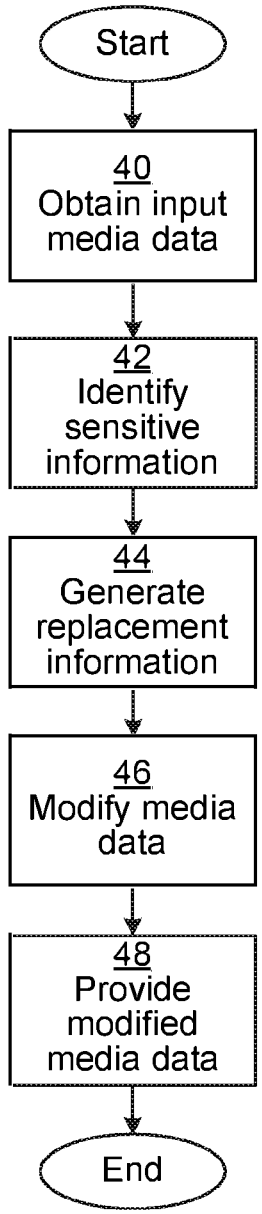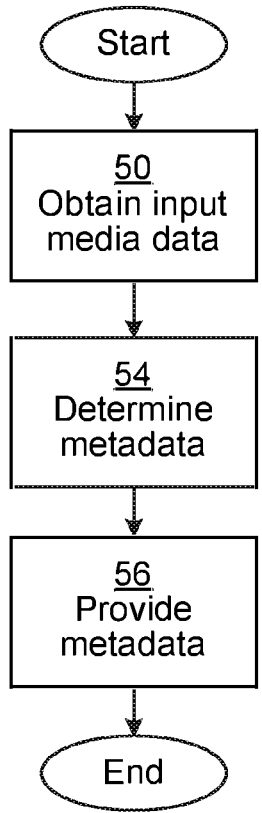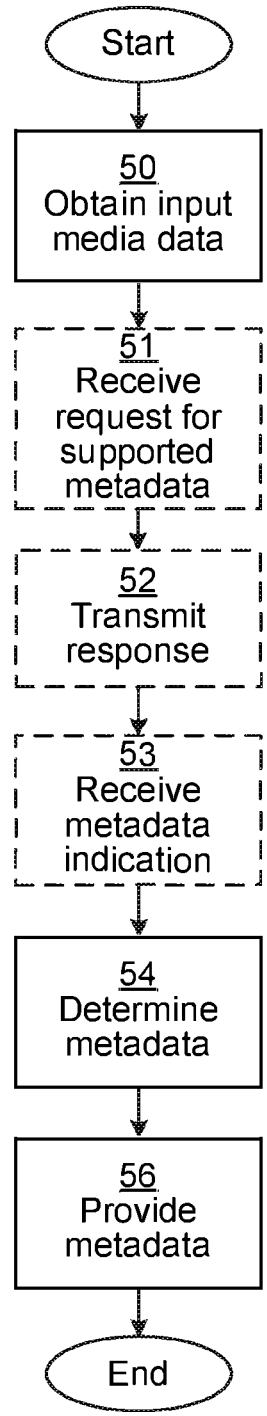
Fig. 3A
Fig. 3B
Fig. 3C

PROCESSING MEDIA DATA WITH SENSITIVE INFORMATION

CROSS REFERENCE TO RELATED APPLICATION

This application is a 35 U.S.C. § 371 national stage application of PCT International Application No. PCT/SE2019/050810 filed on Aug. 30, 2019, the disclosure and content of which is incorporated by reference herein in its entirety.

TECHNICAL FIELD

The present disclosure relates to the field of media data and in particular to processing media data with sensitive information.

BACKGROUND

Video cameras are rapidly becoming more inexpensive and more powerful. This trend in combination with improved computer vision algorithms (e.g. object and face recognition) lead to a high interest in using cameras as sensors.

A wirelessly connected video camera combined with a computer vision algorithm in the camera device or in the cloud can be used in many scenarios. For instance, such a setup can be used for counting the number of people in a room, which can be used to control ventilation, detect age, gender and emotion (based on facial expression) of people to target commercial messages on digital commercial signs, or for detecting that workers wear appropriate protective clothing.

The combination of cheap, powerful cameras and computer vision provides a powerful tool that can be used as a component in many commercial and industrial applications. However, these smart camera applications also raise privacy concerns. If the video stream is sent to a cloud server for processing, individuals can potentially be identified from the video stream.

This means that this type of systems may not be accepted by the public or by authorities. It may be difficult to get permission for using smart cameras in public places since these would be considered to be video surveillance. In many scenarios the privacy of persons in the image is a serious concern and it may also be prohibited to install cameras in public places if individuals can be identified.

It is known to visually blur certain sensitive information in media data. For instance, in the images of the street view application of Google maps, faces and license plates are blurred.

However, by applying blurring, a lot of the useful information in the media data is lost, which means that its value for use in computer vision is lost or at least significantly reduced. Moreover, modern face recognition algorithms can sometimes still identify an individual of a blurred face.

SUMMARY

One objective is to improve how sensitive information in media data is managed while allowing many media data processing algorithms to be applicable.

According to a first aspect, it is provided a method for processing input media data. The method is performed in a media data processor and comprising the steps of: obtaining input media data; identifying, in the input media data, sensitive information; generating replacement information, wherein the replacement information is at least partly anonymised information corresponding to the sensitive information, and the replacement information contains at least one characteristic based on the sensitive information; modifying the input media data by replacing its sensitive information with the replacement information, resulting in a modified media data; and providing the modified media data for further processing.

The input media data and the modified media data may comprise video streams or still images.

The sensitive information may comprise image information of at least one person.

The at least one characteristic may comprise at least one of the characteristics of: age, gender, facial expression, race, eyeglass usage, hairstyle, clothing, jewellery, activity of person, and stance of person.

The step of generating replacement information may comprise generating at least one artificial representation of the person, in accordance with the at least one characteristic.

The artificial representation may be a face.

The step of generating replacement information may comprise generating an artificial representation with the same characteristics for each instance over time of the same person in the sensitive information.

The sensitive information may comprise image information of at least one vehicle license plate.

The input media data and the modified media data may comprise audio streams.

According to a second aspect, it is provided a media data processor for processing input media data. The media data processor comprises: a processor; and a memory storing instructions that, when executed by the processor, cause the media data processor to: obtain input media data; identify, in the input media data, sensitive information; generate replacement information, wherein the replacement information is at least partly anonymised information corresponding to the sensitive information, and the replacement information contains at least one characteristic based on the sensitive information; modify the input media data by replacing its sensitive information with the replacement information, resulting in a modified media data; and provide the modified media data for further processing.

The input media data and the modified media data may comprise video streams or still images.

The sensitive information may comprise image information of at least one person.

The at least one characteristic may comprise at least one of the characteristics of: age, gender, facial expression, race, eyeglass usage, hairstyle, clothing, jewellery, activity of person, and stance of person.

The instructions to generate replacement information may comprise instructions that, when executed by the processor, cause the media data processor to generate at least one artificial representation of the person, in accordance with the at least one characteristic.

The artificial representation may be a face.

The instructions to generate replacement information may comprise instructions that, when executed by the processor, cause the media data processor to generate an artificial representation with the same characteristics for each instance over time of the same person in the sensitive information.

The sensitive information may comprise image information of at least one vehicle license plate.

The input media data and the modified media data may comprise audio streams.

According to a third aspect, it is provided a computer program for processing input media data. The computer program comprises computer program code which, when run on a media data processor causes the media data processor to: obtain input media data; identify, in the input media data, sensitive information; generate replacement information, wherein the replacement information is at least partly anonymised information corresponding to the sensitive information, and the replacement information contains at least one characteristic based on the sensitive information; modify the input media data by replacing its sensitive information with the replacement information, resulting in a modified media data; and provide the modified media data for further processing.

According to a fourth aspect, it is provided a computer program product comprising a computer program according to the third aspect and a computer readable means on which the computer program is stored.

According to a fifth aspect, it is provided a method for processing input media data. The method is performed in a media data processor and comprises the steps of: obtaining input media data; determining metadata based on the input media data; and providing the metadata for further processing while avoiding to provide the input media data.

The media data processor may further comprise a media data capturing unit, in which case the step of obtaining the input media data comprises obtaining the input media data from the media data capturing unit.

The method may further comprise the step of: receiving an indication of what metadata to determine; in which case the step of determining metadata is based on the indication of what metadata to determine.

The method may further comprise the steps of: receiving a request for supported metadata; and transmitting a response indicating at least one type of metadata that the media data processor can determine based on the input media data.

The metadata may comprise at least one metadata being a characteristic of: age, gender, facial expression, race, eyeglass usage, hairstyle, clothing, jewellery, activity of person, stance of person, presence of vehicle, body type of vehicle, model of vehicle, presence of fire, presence of animal, movement of fire, movement of animals, human voice presence, occurrence of breaking glass, occurrence of gun shot, and presence of motor vehicle.

The metadata may comprise a counter of a specific characteristic identified in the input media data.

The input media data may comprise video streams or still images.

The input media data may comprise audio streams.

According to a sixth aspect, it is provided a media data processor for processing input media data. The media data processor comprises: a processor; and a memory storing instructions that, when executed by the processor, cause the media data processor to: obtain input media data; determine metadata based on the input media data; and provide the metadata for further processing while avoiding to provide the input media data.

The media data processor may further comprise a media data capturing unit, in which case the instructions to obtain the input media data comprise instructions that, when executed by the processor, cause the media data processor to obtain the input media data from the media data capturing unit.

The media data processor may further comprise instructions that, when executed by the processor, cause the media data processor to: receive an indication of what metadata to determine, in which case the instructions to determine metadata comprise instructions that, when executed by the processor, cause the media data processor to determine metadata based on the indication of what metadata to determine.

The media data processor may further comprise instructions that, when executed by the processor, cause the media data processor to: receive a request for supported metadata; and transmit a response indicating at least one type of metadata that the media data processor can determine based on the input media data.

The metadata may comprise at least one metadata being a characteristic of: age, gender, facial expression, race, eyeglass usage, hairstyle, clothing, jewellery, activity of person, stance of person, presence of vehicle, body type of vehicle, model of vehicle, presence of fire, presence of animal, movement of fire, movement of animals, human voice presence, occurrence of breaking glass, occurrence of gun shot, and presence of motor vehicle.

The metadata may comprise a counter of a specific characteristic identified in the input media data.

The input media data may comprise video streams or still images.

The input media data may comprise audio streams.

According to a seventh aspect, it is provided a computer program for processing input media data. The computer program comprises computer program code which, when run on a media data processor causes the media data processor to: obtain input media data; determine metadata based on the input media data; and provide the metadata for further processing while avoiding to provide the input media data.

According to an eighth aspect, it is provided a computer program product comprising a computer program according to the seventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIGS. 3A-C are flow charts illustrating embodiments of methods for processing media data;

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
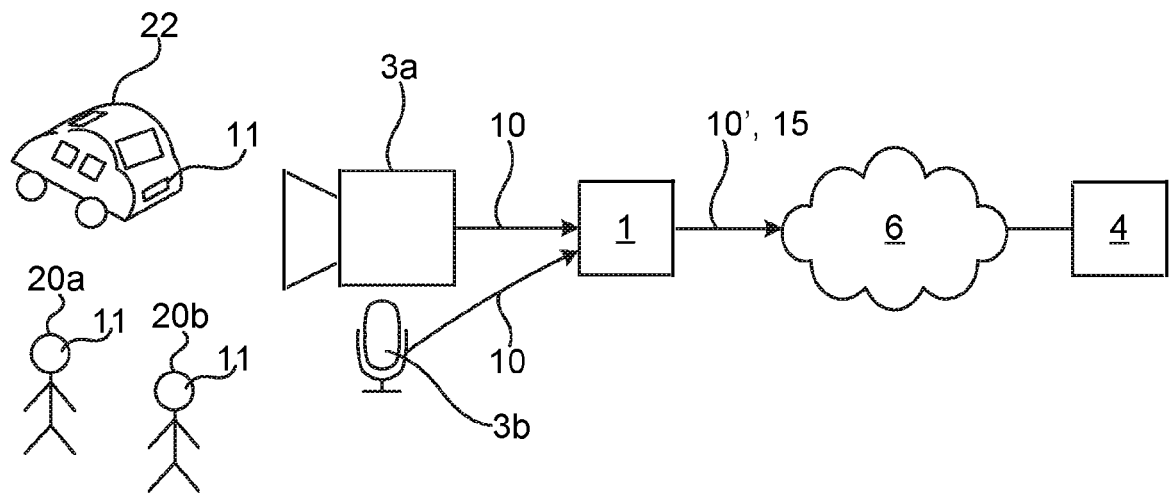
FIG. 1 is a schematic diagram illustrating an environment in which embodiments presented herein can be applied.

FIG. 1 is a schematic diagram illustrating an environment in which embodiments presented herein can be applied. A media data processor 1 obtains input media data 10 in digital form from media data capturing units 3a, 3b, e.g. in the form of a camera 3a and/or a microphone 3b. The camera 3a can be a video camera and/or still image camera. The media data capturing units 3a-b can be internal or external to the media data processor 1.

The input media data 10 can contain sensitive information 11, e.g. of a face of one or more people 20a, 20b and/or a license plate 11 of a vehicle 22. The sensitive information forms part of the input media data 10 that is provided to the media data processor 1. As explained in more detail below, the sensitive information 11 is not forwarded from the media data processor 1.

In one embodiment, modified media data 10' is forwarded by the media data processor 1. The modified data 10' is based on the input media data 10, but where sensitive information is replaced by replacement information, where the replacement information retains some of the characteristics of the sensitive information to allow subsequent processing of the media data while maintaining anonymity.

In one embodiment, metadata 15 based on the input media data 10 is forwarded by the media data processor 1.

The modified data 10' and/or the metadata 15 is forwarded via a network 6 to a recipient node 4. The recipient node 4 can be part of what is commonly referred to as the cloud. The network 6 can be an IP (Internet Protocol) based network such as the Internet or any other suitable communication network. The network 6 can be based on wired and/or wireless/cellular communication.

The recipient node 4 uses the modified media data 10' and/or the metadata 15 to deduce information regarding the real-world situation around the media capturing units 3a, 3b.

Figure 2A:
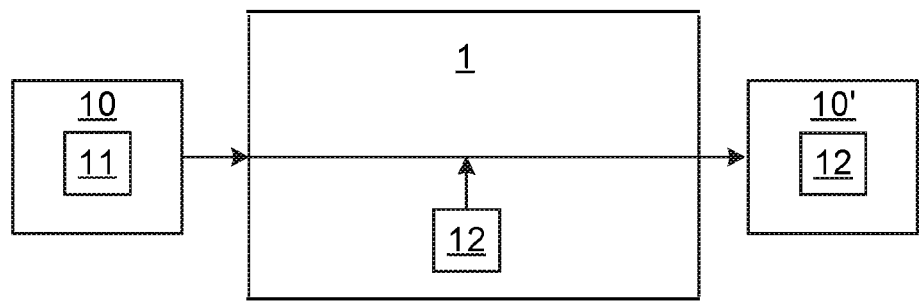
FIGS. 2A-B are schematic drawings illustrating media data processing by the media data processor of FIG. 1 according to two embodiments.
Figure 2B:
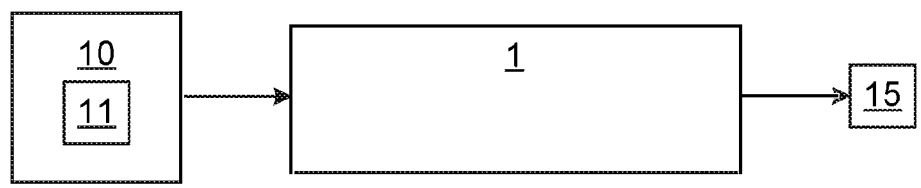

FIGS. 2A-B are schematic drawings illustrating media data processing by the media data processor of FIG. 1 according to two embodiments.

In FIG. 2A, an embodiment is illustrated where the media data processor 1 forwards modified media data 10' based on the input media data 10. The input media data 10 contains sensitive information 11. In order to avoid forwarding the sensitive information 11, the media data processor 1 generates replacement information 12, which corresponds to the sensitive information but is at last partly anonymised. The media data processor 1 replaces the sensitive information 11 with the replacement information 12, to thereby provide modified media data 10'. The modified media data 10' thus contains part of the input media data which is not sensitive, and replacement information 12 which replaces the sensitive information 11 forming part of the input media data 10.

In FIG. 2B, an embodiment is illustrated where the media data processor 1 provides metadata 15 based on the input media data 10 comprising the sensitive information 11. In other words, the media data processor here analyses the input media data 10, including the sensitive information, and deduces certain metadata, as explained in more detail below.

FIGS. 3A-C are flow charts illustrating embodiments of methods for processing media data. These methods are performed in the media data processor. First, embodiments illustrated by the flow chart of FIG. 3A will be described.

In an obtain input media data step 40, the media data processor obtains input media data.

In an identify sensitive information step 42, the media data processor identifies sensitive information in the input media data. The sensitive information can e.g. comprise image information of at least one person. Alternatively or additionally, the sensitive information comprises image information of at least one vehicle license plate.

In a generate replacement information step 44, the media data processor generates replacement information. The replacement information is at least partly anonymised information corresponding to the sensitive information. In one embodiment, the replacement information is completely anonymised information corresponding to the sensitive information. Moreover, the replacement information contains at least one characteristic based on the sensitive information. The at least one characteristic can comprise at least one of the characteristics of: age, gender, facial expression, race, eyeglass usage, hairstyle, clothing, jewellery, activity of person, and stance of person.

Optionally, this step comprises generating at least one artificial representation of the object of sensitive information, in accordance with the at least one characteristic. The artificial representation can be a face. The face can be randomly generated within the constraints of the at least one characteristic. When the sensitive information is a license plate, the license plate can represent the same type of car but anonymously. It is to be noted that the properties of the car itself (e.g. colour, car model) can also be modified using the replacement information.

In one embodiment, this comprises generating an artificial representation with the same characteristics for each instance over time of the same person in the sensitive information. In other words, if the same person is identified over time in successive images of a video stream, the artificial representation for that person is the same or similar across all images. This allows subsequent algorithms of the recipient node e.g. to track movement patterns of people.

In a modify media data step 46, the media data processor modifies the input media data by replacing its sensitive information with the replacement information, resulting in a modified media data.

In a provide modified media data step 48, the media data processor provides the modified media data for further processing, to a recipient node.

The media data (i.e. the input media data and the modified media data) can comprise video streams or still images. Alternatively or additionally, the media data can comprise audio streams. In that case, the sensitive information can e.g. be voices. The replacement information can then be an anonymised voice with at least one corresponding characteristic, e.g. male/female, child/adult, etc. The replacement information is of sufficient quality that the recipient node can e.g. interpret voice commands from the replacement information.

Using the embodiments illustrated by FIG. 3A, the recipient node can employ computer vision algorithms in the same way as on raw video footage and smart applications that rely on identifying number of persons, age, gender, clothing etc.

can be used without modification, while the method ensures that individuals cannot be identified, thus reducing privacy concerns.

Now, embodiments illustrated by the flow chart of FIG. 3B will be described. The embodiments illustrated by FIG. 3B (and FIG. 3C) relate to determining metadata based on the input media data, without forwarding media data. In contrast, the embodiments illustrated by FIG. 3A modifies the input media data and forwards the modified media data.

In an obtain input media data step 50, the media data processor obtains input media data. As mentioned above, the input media data can comprise video streams or still images and/or audio streams. The media data processor can further comprise a media data capturing unit (e.g. camera and/or microphone), in which case, this step comprises obtaining the input media data from the media data capturing unit.

In a determine metadata step 54, the media data processor determines metadata based on the input media data. The metadata can comprise at least one metadata being a characteristic of: age, gender, facial expression, race, eyeglass usage, hairstyle, clothing, jewellery, activity of person, stance of person, presence of vehicle, body type of vehicle, model of vehicle, presence of fire, presence of animal, movement of fire, movement of animals, human voice presence, occurrence of breaking glass, occurrence of gun shot, and presence of motor vehicle. Optionally, the metadata comprises a counter of a specific characteristic identified in the input media data. For instance, the number of people, animals and/or vehicles present.

In a provide metadata step 56, the media data processor provides the metadata for further processing, to a recipient node. However, the media data processor avoids providing the input media data in order to not forward any sensitive information.

Looking now to FIG. 3C, only new or modified steps compared to FIG. 3B will be described.

In an optional receive request for supported metadata step 51, the media data processor receives a request for supported metadata, e.g. from the recipient node.

In an optional transmit response step 52, the media data processor transmits a response indicating at least one type of metadata that the media data processor can determine based on the input media data. The response is transmitted to the node sending the request in step 51, e.g. the recipient node.

In an optional receive metadata indication step 53, the media data processor receives an indication of what metadata to determine. In this case, in the determine metadata step, the determining of metadata is based on the indication of what metadata to determine.

Steps 51 to 53 thus define an API (Application Programming Interface) for the recipient node to control the metadata to be captured by the media data processor based on the input media data.

Using the embodiments illustrated by FIGS. 3B-3C, the recipient node is relieved of analysing media data; this is performed by the media data processor and only the result is provided to the recipient node. This also reduces the bandwidth requirement for the communication between the media data processor and the recipient node.

Using the methods described herein, the sensitive information is never forwarded from the media data processor to the recipient node. When the media data processor is provided in close proximity, such as collocated or even part of the same device, as the media capturing units, this dramatically reduces the risk of sensitive information in the input media data being spread. Moreover, the connection between the media data processor and the media capturing unit(s) can be wired, to reduce the risk of eavesdropping.

Figure 4:
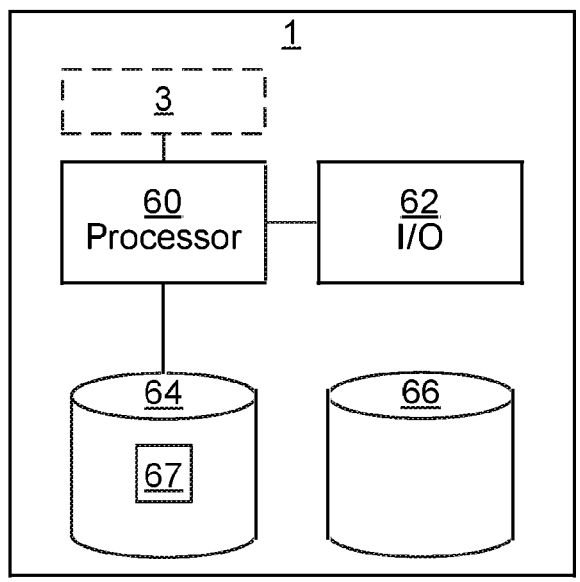
FIG. 4 is a schematic diagram illustrating components of the media data processor of FIG. 1 according to one embodiment.

FIG. 4 is a schematic diagram illustrating components of the media data processor of FIG. 1 according to one embodiment. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-C above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The media data processor 1 further comprises an I/O interface 62 for communicating with external and/or internal entities.

Optionally, the media data processor 1 comprises a media data capturing unit 3, e.g. in the form of a camera (for still or moving images) and/or a microphone.

Other components of the media data processor are omitted in order not to obscure the concepts presented herein.

Figure 5:
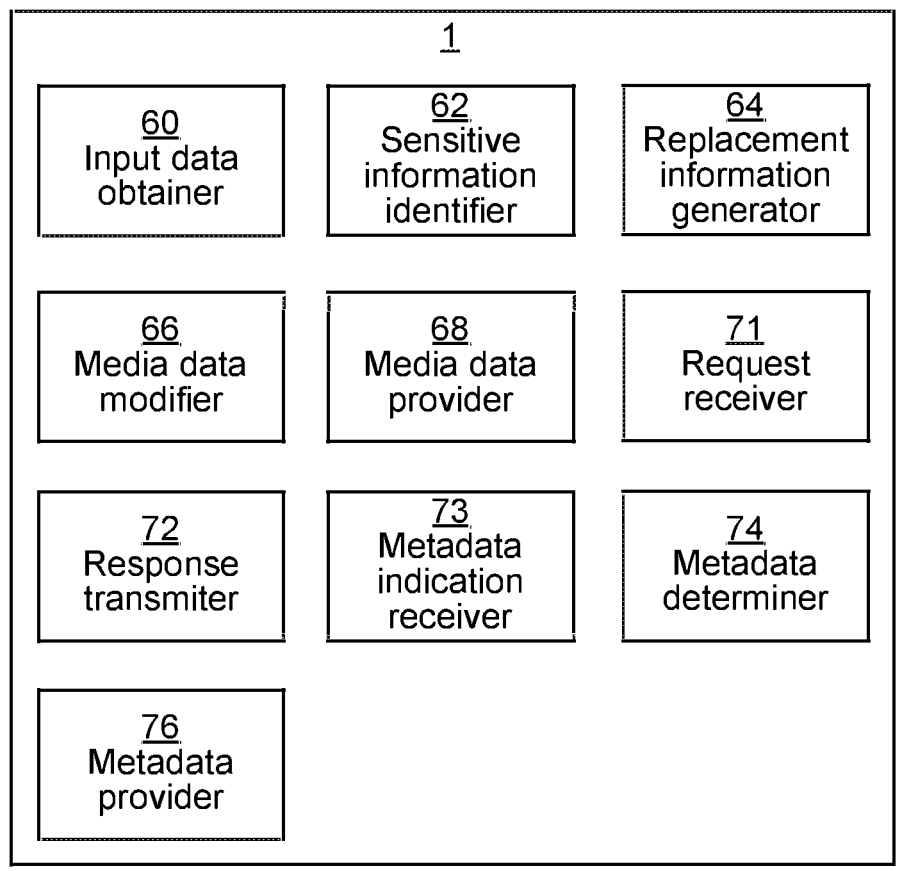
FIG. 5 is a schematic diagram showing functional modules of the media data processor of FIG. 1 according to one embodiment.

FIG. 5 is a schematic diagram showing functional modules of the media data processor 1 of FIG. 1 according to one embodiment. The modules are implemented using software instructions such as a computer program executing in the media data processor 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A-C.

An input data obtainer 60 corresponds to steps 40 and 50. A sensitive information identifier 62 corresponds to step 42. A replacement information generator 64 corresponds to step 44. A media data modifier 66 corresponds to step 46. A media data provider 68 corresponds to step 48. A request receiver 71 corresponds to step 51. A response transmitter 72 corresponds to step 52. A metadata indication receiver 73 corresponds to step 53. A metadata determiner 74 corresponds to step 54. A metadata provider 76 corresponds to step 56.

Figure 6:
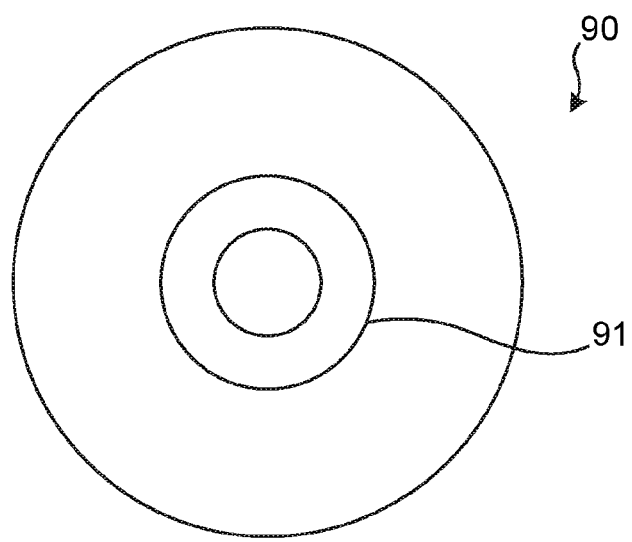
FIG. 6 shows one example of a computer program product comprising computer readable means.

FIG. 6 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for processing input media data, the method being performed in a media data processor and comprising the steps of:
   obtaining input media data;
   identifying, in the input media data, sensitive information;
   generating replacement information, wherein the replacement information is at least partly anonymised information corresponding to the sensitive information, and the replacement information contains at least one characteristic based on the sensitive information;
   modifying the input media data by replacing its sensitive information with the replacement information, resulting in a modified media data; and
   providing the modified media data for further processing.

2. The method according to claim 1, wherein the input media data and the modified media data comprise video streams or still images.

3. The method according to claim 2, wherein the sensitive information comprises image information of at least one person.

4. The method according to claim 3, wherein the at least one characteristic comprises at least one of the characteristics of: age, gender, facial expression, race, eyeglass usage, hairstyle, clothing, jewellery, activity of person, and stance of person.

5. The method according to claim 3, wherein the step of generating replacement information comprises generating at least one artificial representation of the person, in accordance with the at least one characteristic.

6. The method according to claim 5, wherein the artificial representation is a face.

7. The method according to claim 5, wherein the step of generating replacement information comprises generating an artificial representation with the same characteristics for each instance over time of the same person in the sensitive information.

8. The method according to claim 1, wherein the sensitive information comprises image information of at least one vehicle license plate.

9. The method according to claim 1, wherein the input media data and the modified media data comprise audio streams.

10. A media data processor for processing input media data, the media data processor comprising:
    a processor; and
    a memory storing instructions that, when executed by the processor, cause the media data processor to:
    obtain input media data;
    identify, in the input media data, sensitive information;
    generate replacement information, wherein the replacement information is at least partly anonymised information corresponding to the sensitive information, and the replacement information contains at least one characteristic based on the sensitive information;
    modify the input media data by replacing its sensitive information with the replacement information, resulting in a modified media data; and
    provide the modified media data for further processing.

11. The media data processor according to claim 10, wherein the input media data and the modified media data comprise video streams or still images.

12. The media data processor according to claim 11, wherein the sensitive information comprises image information of at least one person.

13. The media data processor according to claim 12, wherein the at least one characteristic comprises at least one of the characteristics of: age, gender, facial expression, race, eyeglass usage, hairstyle, clothing, jewellery, activity of person, and stance of person.

14. The media data processor according to claim 12, wherein the instructions to generate replacement information comprise instructions that, when executed by the processor, cause the media data processor to generate at least one artificial representation of the person, in accordance with the at least one characteristic.

15. The media data processor according to claim 14, wherein the artificial representation is a face.

16. The media data processor according to claim 14, wherein the instructions to generate replacement information comprise instructions that, when executed by the processor, cause the media data processor to generate an artificial representation with the same characteristics for each instance over time of the same person in the sensitive information.

17. The media data processor according to claim 10, wherein the sensitive information comprises image information of at least one vehicle license plate.

18. The media data processor according to claim 10, wherein the input media data and the modified media data comprise audio streams.

19. A computer program for processing input media data, the computer program comprising computer program code which, when run on a media data processor causes the media data processor to:
    obtain input media data;
    identify, in the input media data, sensitive information;
    generate replacement information, wherein the replacement information is at least partly anonymised information corresponding to the sensitive information, and the replacement information contains at least one characteristic based on the sensitive information;
    modify the input media data by replacing its sensitive information with the replacement information, resulting in a modified media data; and
    provide the modified media data for further processing.

20. A computer program product comprising a computer program according to claim 19 and a computer readable means on which the computer program is stored.

* * * * *